(12) United States Patent
Pham (10) Patent No.: US 10,157,534 B2
(45) Date of Patent: Dec. 18, 2018

(54) MULTI-FUNCTION RETROREFLECTIVE ON-BOARD ALERT SYSTEM

(71) Applicant: Tung Thanh Pham, Jacksonville, FL (US)

(72) Inventor: Tung Thanh Pham, Jacksonville, FL (US)

( * ) Notice: Subject to any disclaimer, the term of this patent is extended or adjusted under 35 U.S.C. 154(b) by 0 days.

(21) Appl. No.: 15/583,977

(22) Filed: May 1, 2017

(65) Prior Publication Data

US 2018/0315292 A1    Nov. 1, 2018

(51) Int. Cl.
*B60Q 1/00* (2006.01)
*G08B 21/24* (2006.01)
*B60Q 9/00* (2006.01)
*G08B 21/02* (2006.01)
*H04W 4/14* (2009.01)

(52) U.S. Cl.
CPC ............... *G08B 21/24* (2013.01); *B60Q 9/00* (2013.01); *G08B 21/0283* (2013.01); *H04W 4/14* (2013.01)

(58) Field of Classification Search
CPC .... G08B 21/24; G08B 21/0202; G08B 21/02; G08B 21/0283; B60Q 9/00; H04W 4/14
USPC ........................................................ 340/457
See application file for complete search history.

(56) References Cited

U.S. PATENT DOCUMENTS

| | | | | |
|---|---|---|---|---|
| 8,154,395 B2 * | 4/2012 | Taylor | ................... | G08B 21/24 180/273 |
| 8,892,302 B1 * | 11/2014 | McDonald | ............. | G08B 21/24 701/36 |
| 9,569,948 B1 * | 2/2017 | Platt | ....................... | G08B 21/24 |
| 2006/0180377 A1 * | 8/2006 | Hofbeck | ........... | B60R 21/01534 180/271 |
| 2007/0132571 A1 * | 6/2007 | Rossi | ..................... | B60N 2/002 340/457 |
| 2007/0268119 A1 * | 11/2007 | Cram | ....................... | B60Q 9/00 340/457 |
| 2013/0194089 A1 * | 8/2013 | Estrada | ................... | G08B 21/22 340/457 |
| 2016/0042616 A1 * | 2/2016 | Dorsey | .................. | G08B 21/22 340/457 |
| 2016/0078737 A1 * | 3/2016 | Cohen | ................ | G08B 21/0205 340/457 |
| 2016/0144781 A1 * | 5/2016 | Kleinert | ................... | B60Q 9/00 701/36 |
| 2016/0379466 A1 * | 12/2016 | Payant | ................... | G08B 21/24 340/457 |
| 2017/0011609 A1 * | 1/2017 | Pace | ........................ | G07C 5/08 |
| 2017/0116839 A1 * | 4/2017 | Friedman | ........... | G08B 21/0283 |
| 2017/0263098 A1 * | 9/2017 | Garcia | .................. | B60N 2/002 |
| 2017/0282822 A1 * | 10/2017 | Hunter, Jr. | ............. | B60K 35/00 |
| 2017/0294100 A1 * | 10/2017 | Haskew | .................. | B60Q 9/00 |

* cited by examiner

*Primary Examiner* — Zhen Y Wu
(74) *Attorney, Agent, or Firm* — Mark Young, P.A.

(57) ABSTRACT

An alert system detects the presence of occupants in a vehicle using optical sensors comprised of (infrared) emitters and photodetectors. Each sensor emits a beam across a path in proximity to a seat. Retroreflectors are positioned in the path. A seated occupant blocks the path and prevents reflection. If the path adjacent to a baby's seat is blocked and the path adjacent to the driver's seat is not blocked, an alarm event is triggered. After a delay, voice and text messages and audible and visible output are generated.

20 Claims, 8 Drawing Sheets

MULTI-FUNCTION RETROREFLECTIVE ON-BOARD ALERT SYSTEM

FIELD OF THE INVENTION

This invention relates generally to alert systems for vehicles, and, more particularly, to a system for alerting individuals of children, pets and items left unattended in a vehicle.

BACKGROUND

Occasionally, drivers negligently leave valuables in their vehicles. Perishable foods may create a mess or odor, which can often be remediated. However, when the valuable is a pet or child, the consequences may be tragic. For mothers and fathers who have unintentionally left their child in a car, the aftermath couldn't be much worse. First and foremost, their child may have died. Second, they caused it. And third, the tragedy was completely preventable.

Various systems have been devised to alert drivers to pets and children left in a vehicle. Many of these systems require complex sensors and/or switches and logic to detect the presence of a child. For example, a system may include a switch or sensor (e.g., weight sensor) on a seat or a seat belt. When the seat is occupied or the seat belt is fastened, the system concludes that a child has been placed in the seat. A predetermined time after the vehicle has been turned off and/or the driver's door has been open and closed, the system may determine that the child has been left behind. Some systems attempt to determine distance between the driver and the child seat using an RF signal. For example, a fob possessed by the driver may periodically emit a wireless signal of limited range. A receiver at the child seat may expect to receive the wireless signal. If the signal is not received when scheduled to be received, one or more times, the system determines that a child has been left behind. In such case an alarm is emitted. The alarm may be a text (SMS) message communicated to a phone via cellular network communication, an audible alarm, or a flashing light.

A problem with such systems is unreliability. Neither commercially available vehicles nor commercially available baby seats are equipped with such systems. The paltry few commercially available aftermarket baby alarm systems are generally considered unreliable, emitting frequent false alarms and/or failing to emit an alarm when appropriate. As a result, today, parents and caregivers do not equip their vehicles with alarm systems that detect an unattended baby left behind. Vehicle and baby seat manufacturers are unwilling to incorporate an unreliable system into their products, for obvious reasons, not the least of which are liability exposure and loss of goodwill.

The invention is directed to overcoming one or more of the problems and solving one or more of the needs as set forth above.

SUMMARY OF THE INVENTION

To solve one or more of the problems set forth above, in an exemplary implementation of the invention, an on-board alert system according to principles of the invention detects the presence of occupants, including an infant, using one or more optical (infrared) emitters, each of which emits an infrared beam across a path in the vehicle. Each emitter includes a detector for receiving a reflected beam. retroreflectors are positioned on structures of the vehicle in the path. If an occupant is seated in the path, the infrared beam is not reflected back to the detector. If the beam is reflected, then an occupant is not blocking the path and is likely not present. The system detects reflection of emitted infrared light from a retroreflector in close proximity to or on a baby seat. The system also detects reflection from a retroreflector in close proximity to a driver's seat. The system also detects reflection from a retroreflector in close proximity to a passenger's seat. If the path to the retroreflector associated with the baby's seat is blocked, so that the beam is not reflected back to the detector, and the paths to the passenger's and driver's retroreflectors are not blocked, an alarm event is triggered. In such case, a baby may have been left unattended in a vehicle. The alarm event provides a time delay. After the time delay, the alarm event causes flashing lights, an audible alarm (e.g., sounding of the vehicle's horn), and cellular telephone communications in the form of calls and texts to pre-set numbers.

Additional accessories include a weight sensitive pad to detect cargo (e.g., groceries and pets) left in the back, trunk or other monitored cargo area of the vehicle. An alarm event is triggered if the cargo is left unattended in the vehicle.

Another accessory is a temperature sensor that monitors interior temperature and triggers an alarm event if, while the vehicle is occupied by a person or pet, the interior temperature exceeds a pre-set temperature. Another accessory is a motion sensor which triggers an alarm event upon detecting motion in an unattended vehicle.

An exemplary alert system for a motor vehicle with a driver's seat, a front passenger seat, a first rear passenger seat and a second rear passenger seat is provided. The exemplary alert system includes four photoelectric sensors, each emitting a beam along a path. A retroreflector is provided for each photoelectric sensor. Each beam is aimed at its corresponding retroreflector. Each path extends from the photoelectric sensor to its corresponding retroreflector. Each path is proximate to a seat in the vehicle. When the seat is occupied the path is blocked. When the seat is unoccupied the path is clear. The beam is reflected from the retroreflector back to the photoelectric sensor along a clear path. A notification subsystem (e.g., timing circuit(s), communications and location modules, output relays and audio and visual output devices) is operably coupled to the photoelectric sensors. The notification subsystem activates if a first output is produced from the photoelectric sensor associated with the driver's seat and a binary opposite output is produced from at least one of the photoelectric sensors, with the first output indicating that the first path is not blocked (i.e., that the corresponding driver's seat is not occupied) and the binary opposite output indicating a blockage (i.e., that the corresponding seat is occupied). The notification subsystem includes a timer (timer circuit or function) that activates upon activation of the notification subsystem and causes a delay (i.e., delays an alarm to allow time for a user to intervene). The notification subsystem includes a cellular telephone communication module programmed to send a message (e.g., voice message and/or SMS text message) to at least one telephone number after activation of the notification subsystem and the delay. The message may include a location of the vehicle, as determined by GPS unit integrated with the communication module. A housing contains the photoelectric sensors. The housing may be located substantially between the driver's seat and front passenger seat (e.g., on a console). The housing may include a window in each path for each contained photoelectric sensor.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary alert system for a motor vehicle is provided. The exemplary alert system includes four photoelectric sensors (one for each of a driver's seat, a front passenger seat, a first rear passenger seat and a second rear passenger seat). Each photoelectric sensor emits a beam along a path. A retroreflector is provided for each photoelectric sensor. Each beam is aimed at its corresponding retroreflector. Each path extends from the photoelectric sensor to its corresponding retroreflector. Each path is proximate to a seat in the vehicle. When the seat is occupied the path is blocked. When the seat is unoccupied the path is clear. The beam is reflected from the retroreflector back to the photoelectric sensor along a clear path. A notification subsystem (e.g., timing circuit(s), communications and location modules, output relays and audio and visual output devices) is operably coupled to the photoelectric sensors. The notification subsystem activates if a first output is produced from the photoelectric sensor associated with the driver's seat and a binary opposite output is produced from at least one of the photoelectric sensors, with the first output indicating that the first path is not blocked (i.e., that the corresponding driver's seat is not occupied) and the binary opposite output indicating a blockage (i.e., that the corresponding seat is occupied). The notification subsystem includes a timer (timer circuit or function) that activates upon activation of the notification subsystem and causes a delay (i.e., delays an alarm to allow time for a user to intervene). The notification subsystem includes a cellular telephone communication module programmed to send a message (e.g., voice message and/or SMS text message) to at least one telephone number after activation of the notification subsystem and the delay. The message may include a location of the vehicle, as determined by GPS unit integrated with the communication module. A housing contains the photoelectric sensors. The housing may be located substantially between the driver's seat and front passenger seat (e.g., on a console). The housing may include a window in each path for each contained photoelectric sensor.

Figure 1:
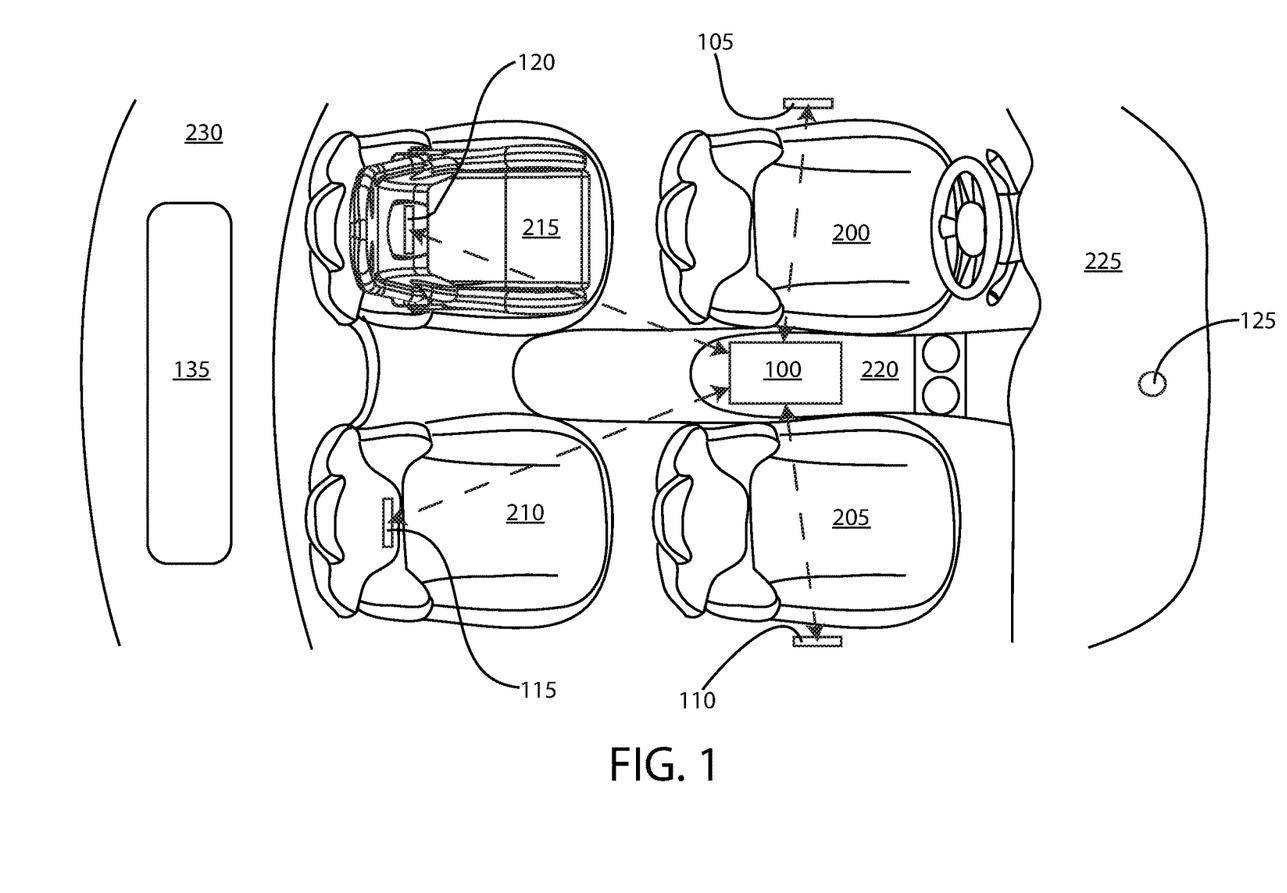
FIG. 1 is a plan view of an automobile interior equipped with an on-board alert system according to principles of the invention.
Figure 2:
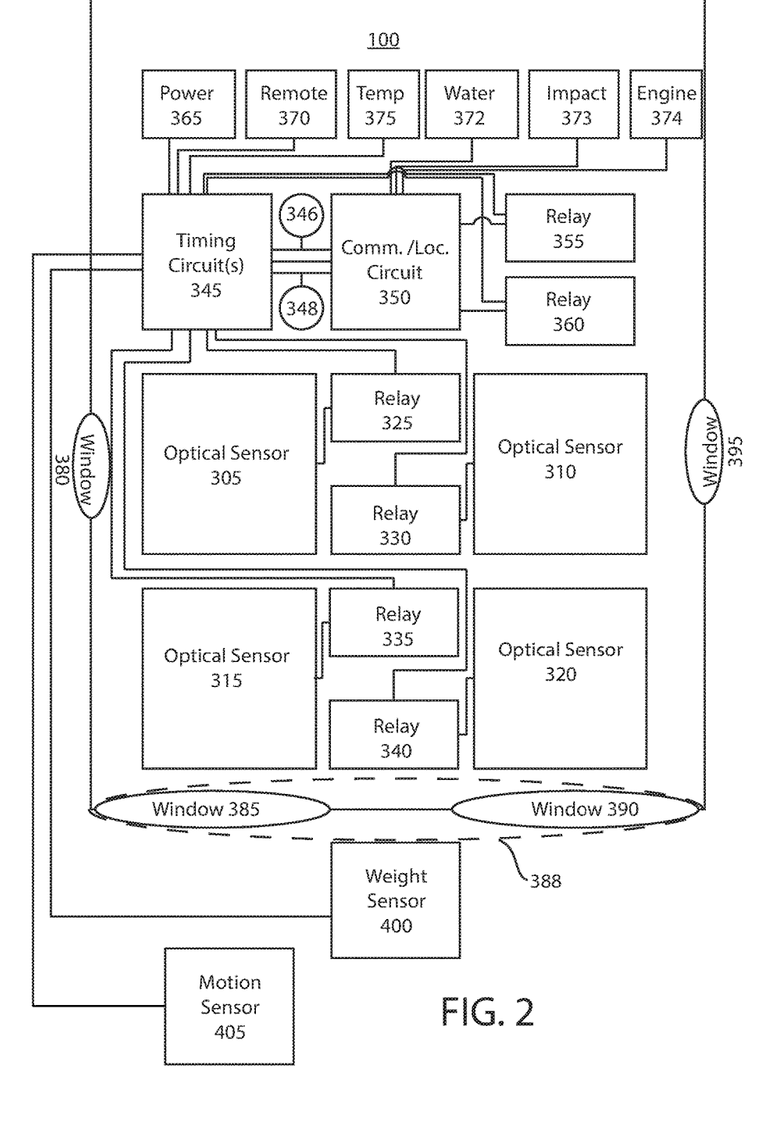
FIG. 2 is a high level schematic that conceptually illustrates components of an exemplary on-board alert system according to principles of the invention.

With reference to FIGS. 1 and 2, an exemplary on-board alert system according to principles of the invention is conceptually illustrated. The system detects the presence of occupants, including an infant, using one or more optical (infrared) emitters, each of which emits an infrared beam across a path in the vehicle. An exemplary vehicle interior is depicted in FIG. 1. The vehicle includes seats for a driver 200, front passenger 205, and rear passengers 210, 215. The rear passenger seats include one infant or child seat 215.

The invention is not limited to a particular vehicle configuration. A system according to principles of the invention may be used in vehicles with additional or fewer rows of seats, with more or less infant seats, and with rear and forward facing infant seats, without departing from the scope of the invention.

A retroreflector 105, 110, 115, 120 is associated with each seat. Each retroreflector is a device or surface that reflects light back to its source, along a vector that is parallel to but opposite in direction from the wave's source, with a minimum of scattering. A retroreflective element may comprise retroreflective glass beads, microprisms, or encapsulated lenses sealed onto a fabric or plastic substrate or embedded in a transparent matrix.

A retroreflector 105, 110, 115, 120 is associated with a seat by mounting the retroreflector on the seat or on another structure (e.g., door panel) adjacent to the seat, in a line of sight with the optical sensor assembly 100. As discussed below, the sensor assembly 100 contains an optical sensor aimed at each such retroreflector. The line of sight extends directly through a space that will be occupied by a person when the person uses the seat. A seated occupant blocks the line of sight.

The optical sensor assembly 100, which contains an optical sensor for each retroreflector, is mounted or contained in the vehicle at a location that provides a line of sight to each retroreflector. One such location for many vehicles is on top of a console 220 between front seats 200, 205. Alternatively, the optical sensor assembly 100 may be formed in a hinged lid of a console or in the body of a console. As another alternative, the optical sensor assembly 100 may be suspended from the interior roof of the vehicle. As yet another alternative, components of the optical sensor assembly 100 may be distributed, i.e., positioned at separate distinct locations of the vehicle, but operably coupled.

An exemplary on-board alert system according to principles of the invention may also include various accessories, including sensors (e.g., weight, motion and/or temperature sensors) and alarm output devices (e.g., sirens and/or strobe lights). By way of example and not limitation, a strobe light 125 and weight sensor 125 are illustrated. The strobe light 125, which is mounted on the dashboard 225, provides a visible alert in the event of an alarm. The weight sensor 125, which may be placed in a cargo area 230, may comprise a pressure-sensitive mat that detects any pressure above a threshold. Illustratively, a pressure-sensitive mat may comprise a rubber or plastic pad that contains a pair of spaced apart deflectable conductors (e.g., steel sheet). When a sufficient pressure is applied, the conductors deflect, come in contact and complete a circuit, thus indicating the presence of a sensible pressure or weight.

With reference to FIG. 2, a high level schematic that conceptually illustrates components of an exemplary onboard alert system according to principles of the invention is provided. The system 100 includes a plurality of optical switches. Each optical switch includes an optical sensor 305, 310, 315, 320 and a relay 325, 330, 335, 340. Thus, sensor 305 and relay 325 comprise an optical switch; sensor 310 and relay 330 comprise an optical switch; sensor 315 and relay 335 comprise an optical switch; and sensor 320 and relay 340 comprise an optical switch. An exemplary optical sensor is an Omron E3JK R4M2, infrared photoelectric sensor, which includes an integrated relay for output, and provides a 4 m sensing range for a retroreflector. Each sensor emits a light beam (e.g., an infrared beam) and receives reflected light through an associated window 380, 385, 390, 395 in the system 100. Each window 380, 385, 390, 395 may comprise a transparent panel or an opening through which light may travel. The transparent panel may comprise a transparent plastic or glass lens through which light may travel relatively undisturbed.

The optical (photoelectric) sensors 305, 310, 315, 320 include a light source (e.g., LED), a receiver (phototransistor), a signal converter, and an amplifier. The phototransistor analyzes incoming light, verifies that it is from the LED, and appropriately triggers an output. The source and receiver are in the same housing. A reflector (i.e., a retroreflector) on a target is used to reflect light from the source back to the receiver. An obstacle (e.g., person) is detected when it blocks a light beam from reaching a reflector. The sensors may be configured (e.g., polarized) to distinguish light reflected from the reflector from light from other sources.

The optical switches are operably coupled to one or more timing circuits 345. In an exemplary embodiment, the timing circuits are trigger cycle timing delay switch circuits, with relays (e.g., relays 355, 360) to actuate devices, such as vehicle horns, sirens and strobe lights. In another embodiment, timing functions may be performed by a programmed micrcocontroller operably coupled to relays. The timing circuits provide a delay between a sensed possible alarm event and the actual trigger of an alarm. The timing circuits also regulate the duration of an alarm. For example, if the optical switches determine that a child has been left unattended in a vehicle, the timing circuits may delay an alarm for 30 seconds. The delay allows time for someone to remove the child and avoid an alarm.

The rear facing window(s) may be a single large window 388 or a plurality of relatively large windows 385, 390. Each window 380, 385, 388, 390, 395 may be sized with sufficient width to allow adjusting the angle of the corresponding optical sensor 305, 310, 315, 320. Angle may be adjusted by rotating an optical sensor about a vertical axis. The optical sensor may be secured in a desired angular position using any releasable mechanical fasteners (e.g., screws). In this manner, an optical sensor may be aimed at a retroreflector in a multitude of positions.

Optionally, the pitch of each optical sensor 305, 310, 315, 320 may be adjustable by inserting shims below the leading (emitting) edge of the optical sensor or by rotating the optical sensor about a horizontal axis. The optical sensor may be secured in a desired angular position using any releasable mechanical fasteners (e.g., screws). In this manner, an optical sensor may be aimed at a retroreflector in a great multitude of positions.

Switches 346, 348 provide an emergency activation and a reset. The emergency activation switch 346 produces an instantaneous alarm, without a delay. It is a panic button, accessible by a user in the vehicle. The reset 348 cancels a timing sequence (i.e., a countdown) by restoring the timing circuit to an initial (e.g., idle) state. A user may press the reset 348 to avoid an alarm or to cancel an alarm in progress.

A communications/location module (e.g., a GPS GSM GPRS Real Time Tracker) 350 provides communication and location functions. The module 350 may be programmed with telephone numbers to call and text (SMS) in the event of an alarm. A voice message may be stored on the module 350 for transmission to a dialed number in the event of an alarm. The module 350 includes GPS functionality. Thus, a GPS location (e.g., latitude and longitude, and/or a link to a map, and/or an address corresponding to the latitude and longitude) may be communicated via SMS in the event of an alarm. An exemplary module 350 utilizes a GPS SIM card to connect to a service provider's cellular communication network. A timing circuit 345 initiates the communication and location process by transmitting a signal to the module 350. The timing circuit may delay the communication and location process or initiate the process immediately. The delay may be preset or user configurable. The communication and location process may also be initiated by a relay triggered by a sensor or a microcontroller coupled to a sensor. If a sensor detects a condition that warrants an immediate notification without delay, the sensor signal may go to a microcontroller that initiates the communication and location process by transmitting a signal to the module 350 either directly by sending a signal to the module 350 or by activating a relay coupled to the module 350.

A remote control module 370 receives wireless (e.g., RF) signals from a remote control unit (e.g., a key fob) to perform basic functions, such as power on/off, reset, and emergency activation.

A temperature sensor 375 may monitor temperature within the vehicle. If the temperature infrared beam is not reflected back to the detector. If the beam is reflected, then an occupant is not blocking the path and is likely not present. The system detects reflection of emitted infrared light from a retroreflector in close proximity to or on a baby seat. The system also detects reflection from a retroreflector in close proximity to a driver's seat. The system also detects reflection from a retroreflector in close proximity to a passenger's seat. If the path to the retroreflector associated with the baby's seat is blocked, so that the beam is not reflected back to the detector, and the paths to the passenger's and driver's retroreflectors are not blocked, an alarm event is triggered. In such case, a baby may have been left unattended in a vehicle. The alarm event provides a time delay. After the time delay, the alarm event causes flashing lights, an audible alarm (e.g., sounding of the vehicle's horn), and cellular telephone communications in the form of calls and texts to pre-set numbers. Additional accessories include a weight sensitive pad 400 to detect cargo (e.g., groceries and pets) left in the back, trunk or other monitored cargo area of the vehicle. Again, an alarm event is triggered if the cargo is left unattended in the vehicle. Another accessory is a temperature sensor 375 that monitors interior temperature and triggers an alarm event if, while the vehicle is occupied by a person or pet, the interior temperature exceeds a pre-set temperature. Another accessory is a motion sensor 405 which triggers an alarm event upon detecting motion in an unattended vehicle. Another accessory is a water sensor 372 that triggers an alarm if the sensor is submerged. The water sensor may comprise a float valve and/or a conductivity sensor which relies on the electrical conductivity of water to decrease the resistance across two contacts. The water sensor triggers an immediate alarm if water is detected, such as during a flood, accident leaving the vehicle in a body of water, or attempt to drive across flooded streets. Another accessory is an impact sensor 373 that immediately triggers an alarm upon a sensed impact that exceeds a predetermined magnitude. The sensor may comprise one or more accelerometers to detect accelerations in multiple directions, a spring mass sensor with the mass completing a circuit upon a sufficient disturbance, and/or a magnetic ball dislodged from a holder and rolling to a resting point where a switch is closed or a circuit is completed, or a switch is opened upon dislodgment. This sensor triggers an alarm immediately in the event of an accident whether or not the vehicle is occupied. Another accessory is an engine running sensor 374 that triggers an alarm if the engine is left running in a vehicle without an occupied driver's seat, after a determined period of time. This sensor may connect to the vehicle's OBDII port or similar computer port. Among other things, this sensor helps guard against CO poisoning from a vehicle inadvertently left running in a garage.

Certain sensors first trigger a time delay (i.e., countdown) before an alarm is triggered. The duration of the countdown may vary. The countdown allows sufficient time for a notified person to take appropriate corrective action. For example, if a child is left in a car, the countdown may allow the notified person an opportunity to return to the car and remove the child, before triggering a full alarm with a siren or horn and flashing lights.

Certain sensors may not trigger a countdown. For example, an impact, flood, or engine-on, may trigger an immediate alarm. No delay is appropriate in such events.

A power management module 365 provides power supply and regulation functions for timing circuit boards and other components that require an input DC voltage below 12 volts. The module may comprise a step down converter or transformer or a buck converter that converts 12 volt DC input from the vehicle's electric power supply to 5 volt DC output suitable for electronics.

Figure 3:
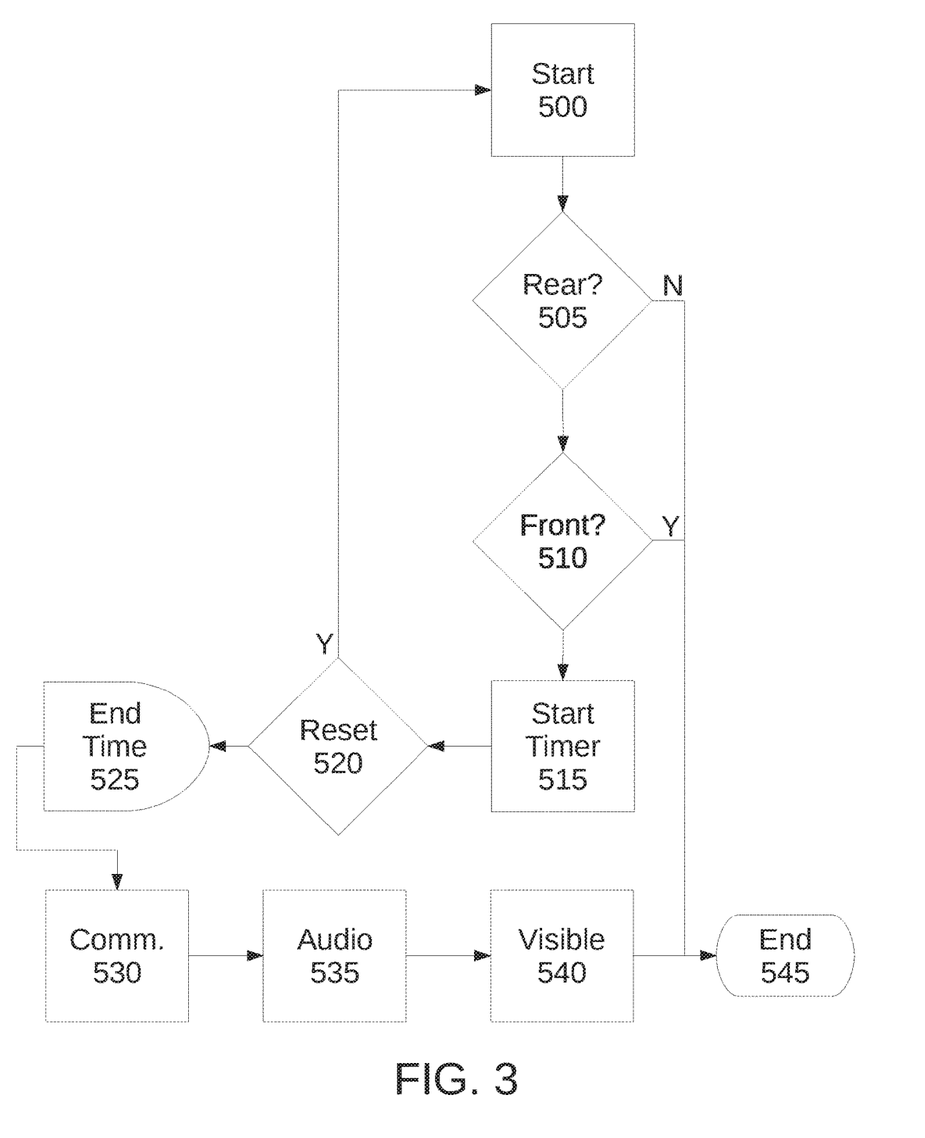
FIG. 3 is a high level flowchart illustrating steps of an exemplary method of providing an alert according to principles of the invention.

FIG. 3 provides a high level flowchart illustrating steps of an exemplary method of providing an alert according to principles of the invention. Upon startup 500, the system responds to optical sensor output. Children are most likely to be transported in a rear seat of the vehicle. In such case, the system determines if an occupant is in a rear seat 505. If an occupant is present in a rear seat, then a beam emitted from an optical sensor towards the retroreflector associated with that seat will not be reflected back to the optical sensor. If the retroreflector reflects the light beam back to the optical sensor, then the system considers that seat to be vacant. The system also determines if a front seat is occupied 510. Adolescents and adults are more likely than infants to occupy front seats. If an occupant is present in a front seat, then a beam emitted from an optical sensor towards the retroreflector associated with that seat will not be reflected back to the optical sensor. If the retroreflector reflects the light beam back to the optical sensor, then the system considers that seat to be vacant. If a rear seat is occupied and a front seat is vacant, it is possible that a child has been left unattended in the vehicle. In such case, a timer is started 515. The timer provides a delay before triggering an alarm. After the timer has started, an adult may activate a reset button 520 to obviate an alarm. However, if a reset button has not been activated 520 and the timer has reached the end of the time cycle (e.g., the countdown has finished) 525, the system causes the communication module to communicate an alert and location. The communication may be a voice message and/or SMS text message communicated to each cellular telephone number on a list. The message may describe the detected event (e.g., "a child is unattended in your Honda Pilot"). A text message may include a location of the vehicle. Additionally, if a reset button has not been activated 520 and the timer has reached the end of the time cycle (e.g., the countdown has finished) 525, the system causes audio output in the form of a honking horn or siren 535 and visible output in the form of a flashing light (strobe) 540. The process ends 545 after a user resets the system.

A method according to principles of the invention may monitor various seats. For example, a method according to principles of the invention may start the timer to trigger an alarm if any occupant remains in a rear seat after the driver has left the vehicle. Alternatively, a method according to principles of the invention may start the timer to trigger an alarm if any occupant remains in a rear seat or in the front passenger seat after the driver has left the vehicle. As another alternative, a method according to principles of the invention may start the timer to trigger an alarm if any occupant remains in one specific seat (e.g., the passenger's side or the driver's side rear seat) after the driver has left the vehicle. That specific seat may correspond to a baby seat.

Figure 4:
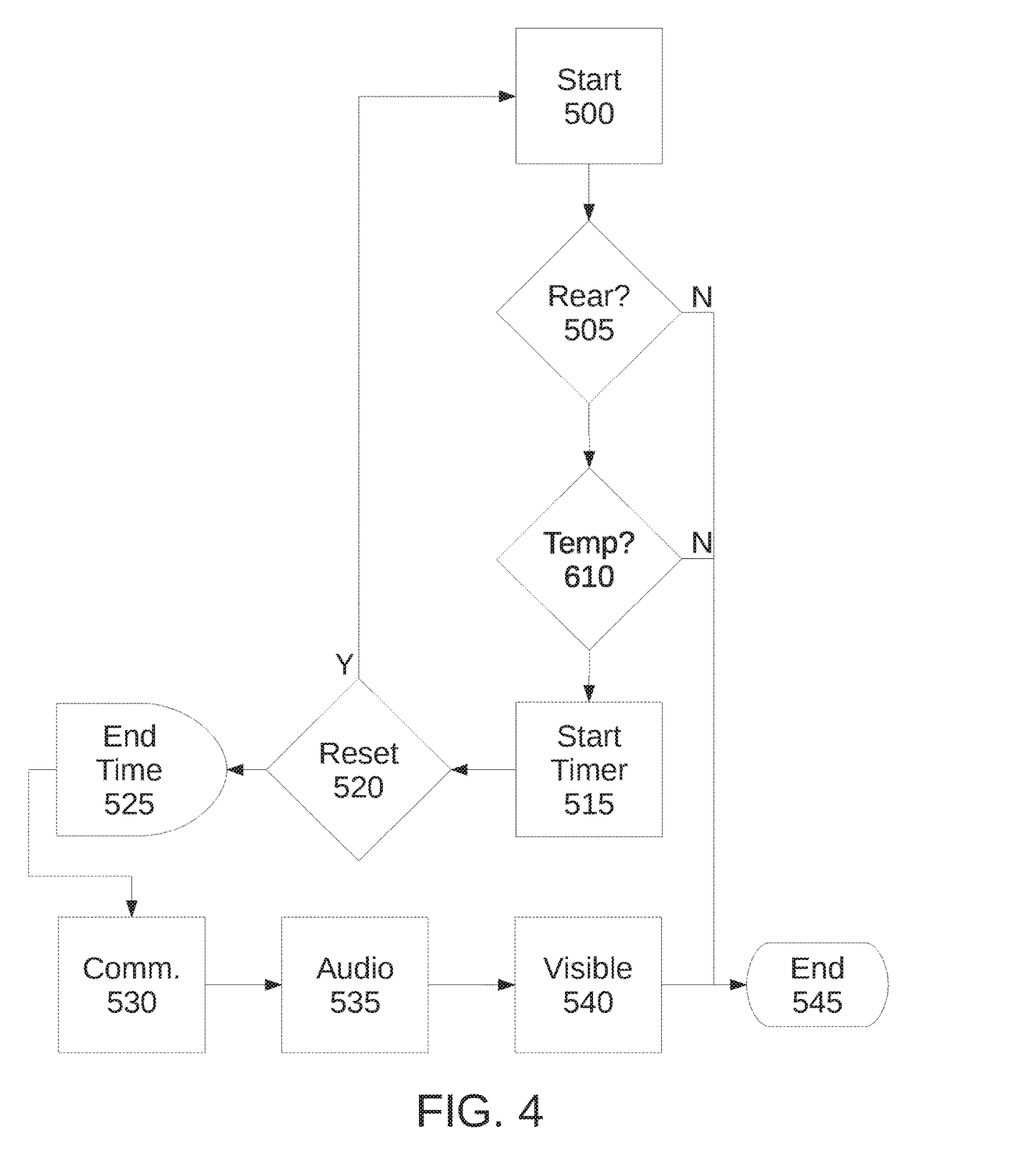
FIG. 4 is another high level flowchart illustrating steps of an exemplary method of providing an alert according to principles of the invention.

FIG. 4 is another high level flowchart illustrating steps of an exemplary method of providing an alert according to principles of the invention. While similar to the method of FIG. 3, this method monitors occupancy and temperature. If a monitored (e.g., rear) seat is occupied 505 and, according to a temperature sensor, the interior temperature exceeds a threshold or is outside a range of acceptable temperatures 610, then a timer is started 515 to produce an alarm, as in steps 515-545. This method may be performed concurrent with the method of FIG. 3. In sum, the system may simultaneously monitor occupancy and temperature.

Figure 5:
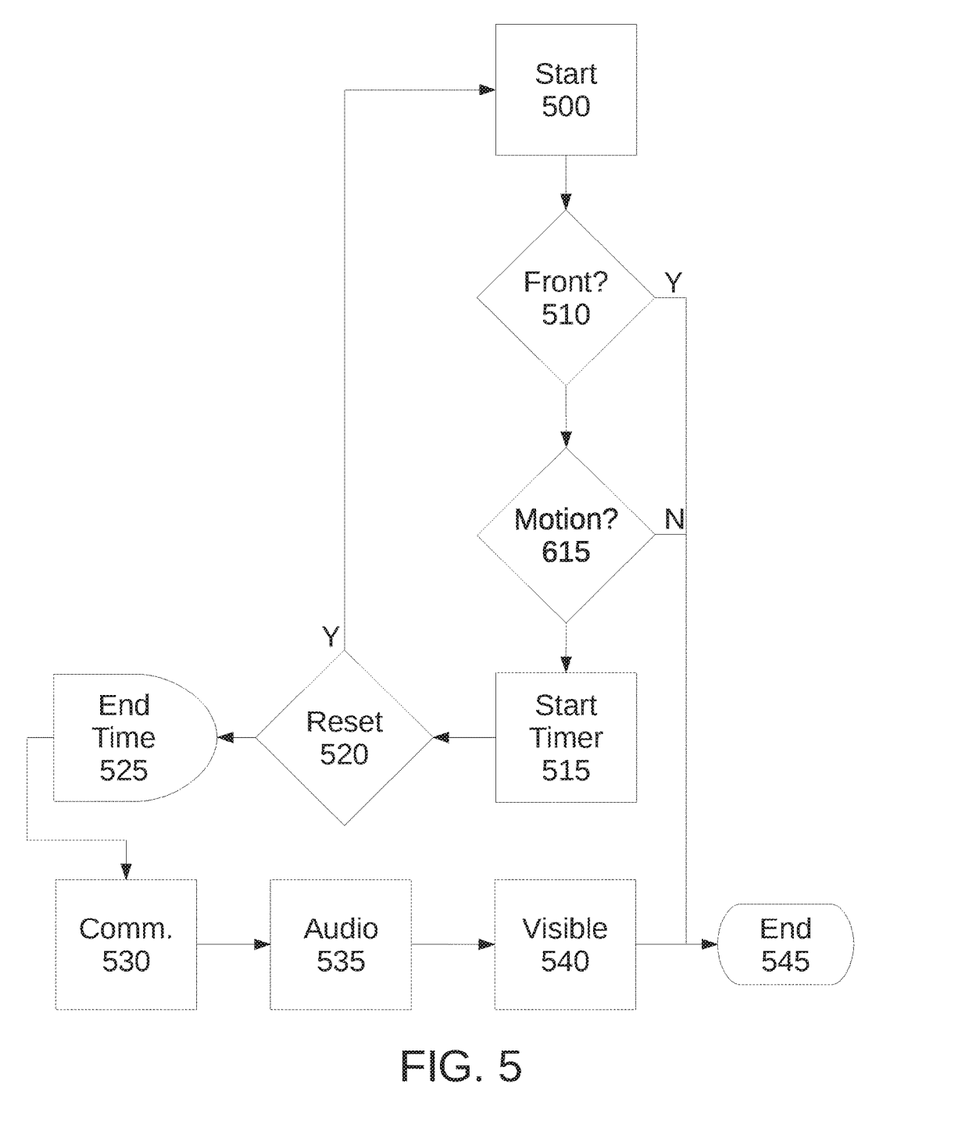
FIG. 5 is another high level flowchart illustrating steps of an exemplary method of providing an alert according to principles of the invention.

FIG. 5 is another high level flowchart illustrating steps of an exemplary method of providing an alert according to principles of the invention. As another example, motion may be monitored. Using a motion sensor (passive infrared, microwave, or ultrasonic motion sensor), the system may detect motion 615 after a driver has vacated the vehicle. Such motion may indicate a pet or child left unattended and possibly roaming in the vehicle. If the front seats are vacant 510 and, according to a motion sensor, there is a pet or person moving in the vehicle 615, then a timer is started 515 to produce an alarm, as in steps 515-545. This method may be performed concurrent with the method of FIGS. 3 and 4. In sum, the system may simultaneously monitor occupancy, motion and temperature.

Figure 6:
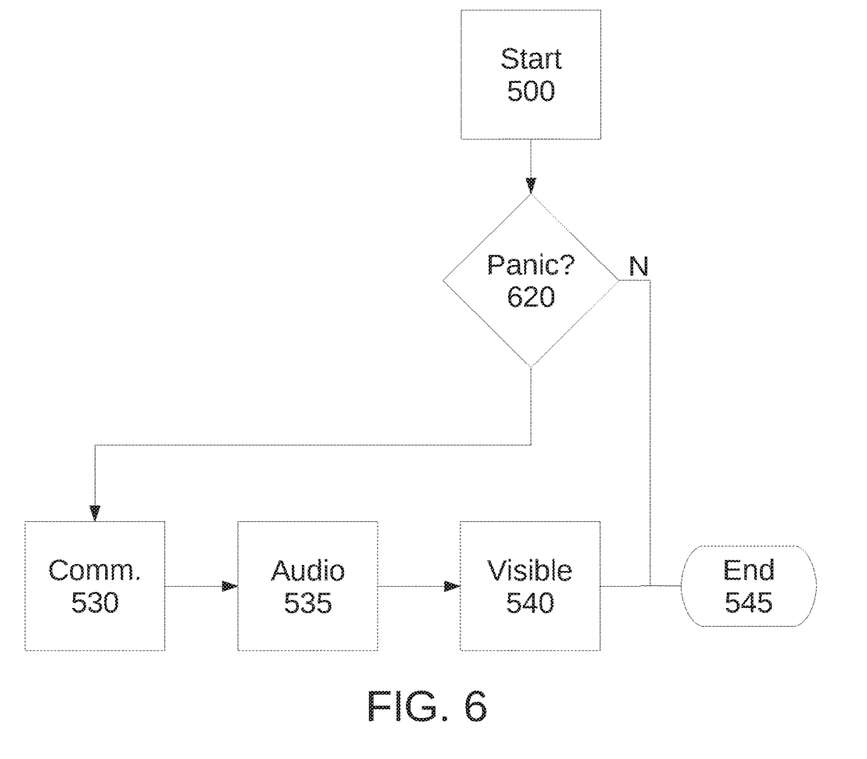
FIG. 6 is another high level flowchart illustrating steps of an exemplary method of providing an alert according to principles of the invention.

FIG. 6 is another high level flowchart illustrating steps of an exemplary method of providing an alert according to principles of the invention. The system may include a switch (e.g., button) to immediately trigger an alarm. Such a switch is referenced herein as a "panic" button. Upon pressing the panic button 620, the alarm is immediately produced without delay, as in steps 530-545. This method may be performed concurrent with the method of FIGS. 3, 4 and 5. In sum, the system may simultaneously monitor occupancy, motion and temperature, while being available for immediate user activation of an alarm.

Figure 7:
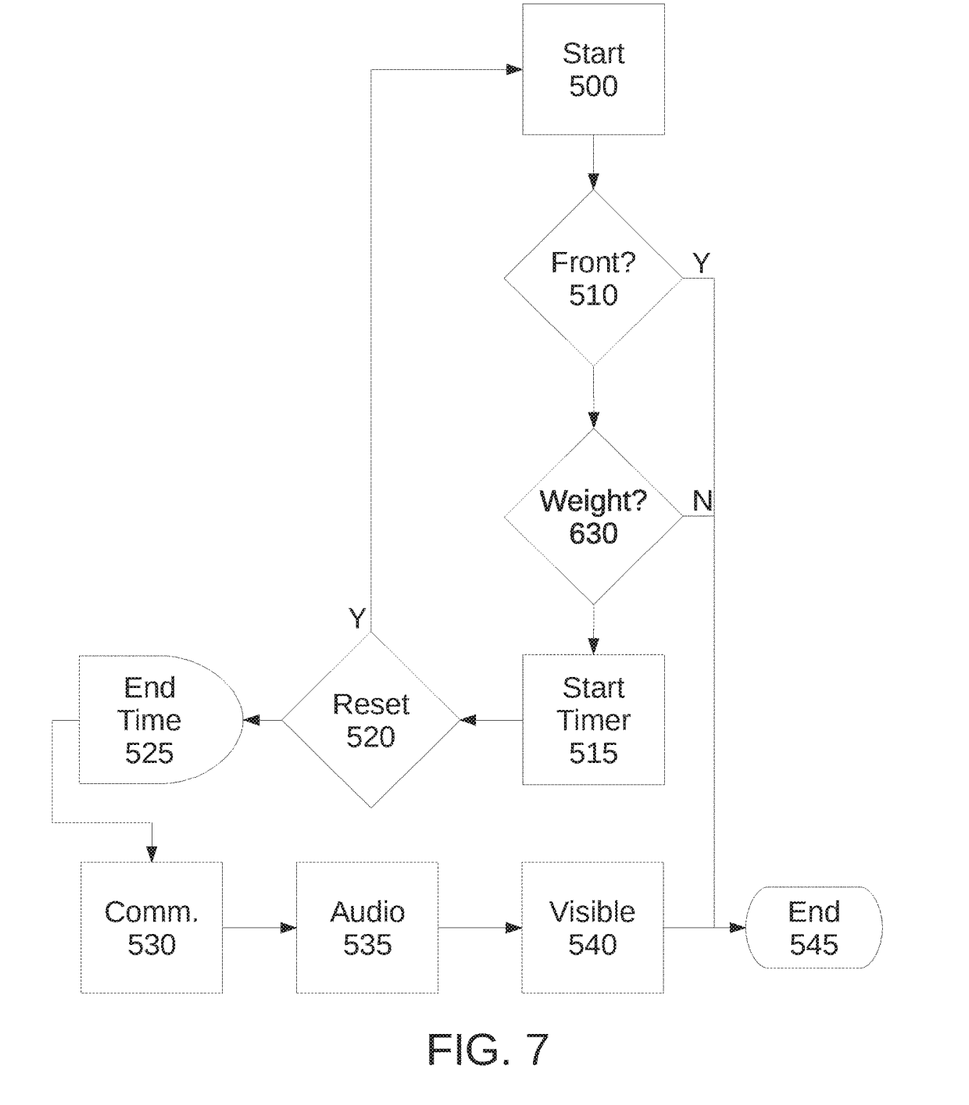
FIG. 7 is another high level flowchart illustrating steps of an exemplary method of providing an alert according to principles of the invention.

FIG. 7 is another high level flowchart illustrating steps of an exemplary method of providing an alert according to principles of the invention. As another example, weight or pressure may be monitored. Using a pressure sensitive pad, the system may detect weight 630 after a driver has vacated the vehicle. Such weight may indicate perishable groceries or a pet left unattended in the vehicle. If the front seats are vacant 510 and, according to a pressure sensitive mat, there is an object on the mat 630, then a timer is started 515 to produce an alarm, as in steps 515-545. This method may be performed concurrent with the method of FIGS. 3, 4, 5, 6 and 7. In sum, the system may simultaneously monitor occupancy, motion, temperature and weight on a mat, while being available for immediate user activation of an alarm.

Figure 8:
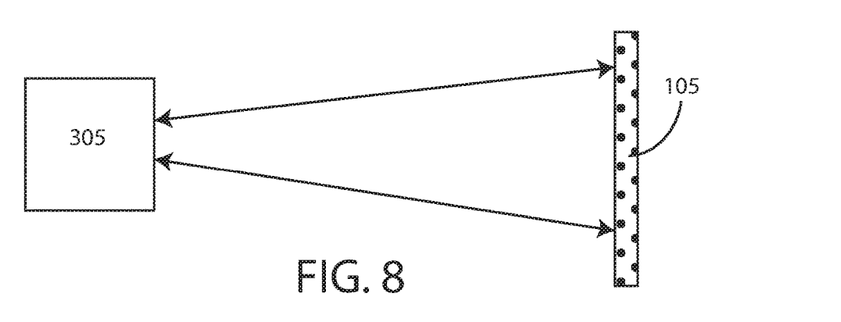
FIG. 8 is a schematic that conceptually illustrates an optical sensor aimed at a retroreflector according to principles of the invention.
Figure 9:
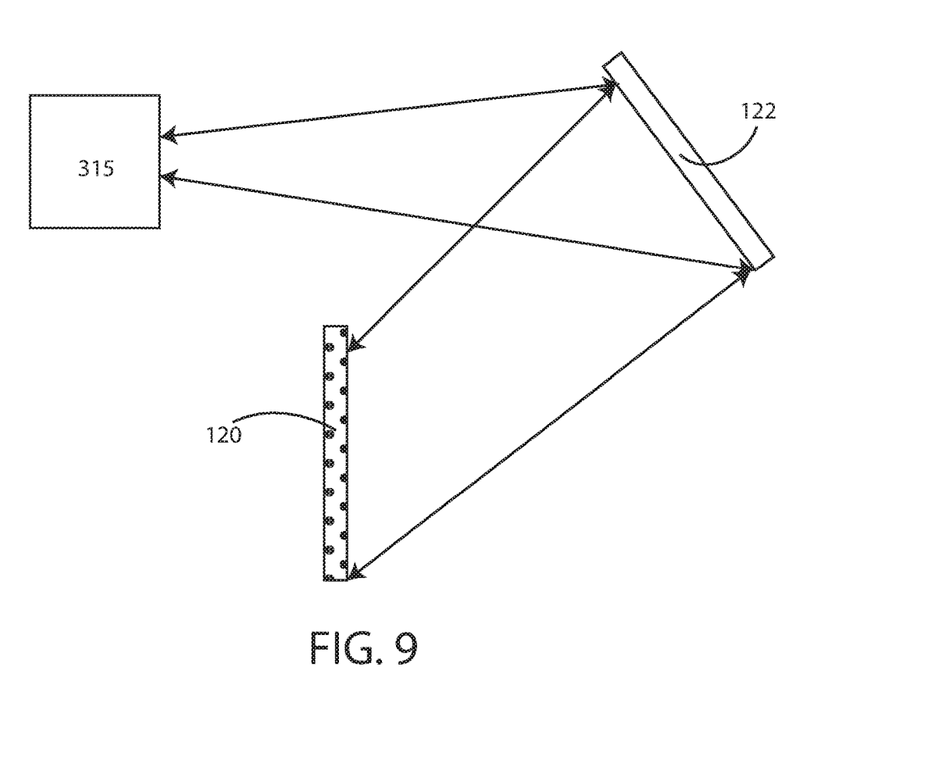
FIG. 9 is a schematic that conceptually illustrates an optical sensor aimed at a mirror aimed at a retroreflector according to principles of the invention.

A path may be a straight line or bent. As illustrated in an optical sensor 305 may be aimed directly aimed at a retroreflector 105. However, one or more mirrors may be used to change the direction of a path. Illustratively, FIG. 9 shows an angled mirror 122 between optical sensor 315 and retroreflector 120. The angle of incidence being equal to the angle of reflection, a 45 degree angle is preferred. Such an angle is useful for directing a path past an infant in a rearward facing infant seat.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An alert system for a motor vehicle having a driver's seat, a center console, and at least one front passenger seat and at least one rear passenger seat, the center console being aligned with and between the driver's seat and the front passenger seat, the alert system comprising:
    a first photoelectric sensor, at the center console, emitting a first beam along a first path;
    a first retroreflector within the vehicle, the first beam aimed at the first retroreflector, and the first path extending from the first photoelectric sensor to the first retroreflector;
    the first path being proximate to and extending across the driver's seat, and when the driver's seat is occupied, the first path being blocked;
    a second photoelectric sensor, at the center console, emitting a second beam along a second path;
    a second retroreflector within the vehicle, the second beam aimed at the second retroreflector, and the second path extending from the second photoelectric sensor to the second retroreflector;
    the second path being proximate to the at least one rear passenger seat, the at least one rear passenger seat being a child seat, and when the child seat is occupied, the second path being blocked;
    a notification subsystem operably coupled to the first photoelectric sensor and the second photoelectric sensor, the notification subsystem activating if a first output is produced from the first photoelectric sensor and a second output is produced from the second photoelectric sensor, the first output and the second output being binary opposites.

2. The alert system of claim 1, the first output indicating that the first path is not blocked, and the second output indicating that the second path is blocked.

3. The alert system of claim 1, the notification subsystem including a timer, the timer activating upon activation of the notification subsystem and causing a delay.

4. The alert system of claim 1, the notification subsystem including a cellular telephone communication module programmed to send a message to at least one telephone number after activation of the notification subsystem and a delay.

5. The alert system of claim 1, the notification subsystem including a cellular telephone communication module programmed to send a message to at least one telephone number upon activation of the notification subsystem.

6. The alert system of claim 1, the notification subsystem including a cellular telephone communication module programmed to send a short message service text message to at least one telephone number upon activation of the notification subsystem.

7. The alert system of claim 1, the notification subsystem including a cellular telephone communication and location module programmed to send a message to at least one telephone number upon activation of the notification subsystem, said message including a location of the vehicle.

8. An alert system for a motor vehicle having a driver's seat, a front passenger seat, a first rear passenger seat and a second rear passenger seat, the alert system comprising:
    a first photoelectric sensor, between the driver's seat and front passenger seat, emitting a first beam along a first path;
    a first retroreflector within the vehicle, the first beam aimed at the first retroreflector, and the first path extending from the first photoelectric sensor to the first retroreflector;
    the first path being proximate to and extending across the driver's seat, and when the driver's seat is occupied, the first path being blocked;
    a second photoelectric sensor, between the driver's seat and front passenger seat, emitting a second beam along a second path;
    a second retroreflector within the vehicle, the second beam aimed at the second retroreflector, and the second path extending from the second photoelectric sensor to the second retroreflector;
    the second path being proximate to the front passenger seat;
    a third photoelectric sensor emitting a third beam along a third path;
    a third retroreflector within the vehicle, the third beam aimed at the third retroreflector, and the third path extending from the third photoelectric sensor to the third retroreflector;
    the third path being proximate to the first rear passenger seat, and when the first rear passenger seat is occupied, the third path being blocked;
    a fourth photoelectric sensor emitting a fourth beam along a fourth path;
    a fourth retroreflector within the vehicle, the fourth beam aimed at the fourth retroreflector, and the fourth path extending from the fourth photoelectric sensor to the fourth retroreflector;
    the fourth path being proximate to the second rear passenger seat;

a notification subsystem operably coupled to the first photoelectric sensor, the second photoelectric sensor, the third photoelectric sensor, and the fourth photoelectric sensor, the notification subsystem activating if a first output is produced from the first photoelectric sensor and a binary opposite output is produced from at least one of the second photoelectric sensor, third photoelectric sensor, and the fourth photoelectric sensor.

9. The alert system of claim 8, the first output indicating that the first path is not blocked, and the binary opposite output indicating a blockage.

10. The alert system of claim 8, the notification subsystem including a timer, the timer activating upon activation of the notification subsystem and causing a delay.

11. The alert system of claim 10, the notification subsystem including a cellular telephone communication module programmed to send a message to at least one telephone number after activation of the notification subsystem and the delay.

12. The alert system of claim 8, the notification subsystem including a cellular telephone communication module programmed to send a message to at least one telephone number after activation of the notification subsystem.

13. The alert system of claim 8, the notification subsystem including a cellular telephone communication module programmed to send an SMS text message to at least one telephone number after activation of the notification subsystem.

14. The alert system of claim 8, the notification subsystem including a cellular telephone communication and location module programmed to send a message to at least one telephone number after activation of the notification subsystem, said message including a location of the vehicle.

15. The alert system of claim 9, the notification subsystem including a timer, the timer activating upon activation of the notification subsystem and causing a delay.

16. The alert system of claim 15, the notification subsystem including a cellular telephone communication module programmed to send a message to at least one telephone number after activation of the notification subsystem and the delay, said message including a location of the vehicle.

17. The alert system of claim 16, the binary opposite output being produced from at least one of the third photoelectric sensor, and the fourth photoelectric sensor and indicating at least one occupant in at least one of the first rear passenger seat; and the second rear passenger seat.

18. The alert system of claim 8, the binary opposite output being produced from at least one of the third photoelectric sensor, and the fourth photoelectric sensor and indicating at least one occupant in at least one of the first rear passenger seat; and the second rear passenger seat.

19. The alert system of claim 8, further comprising a housing containing the first photoelectric sensor, the second photoelectric sensor, the third photoelectric sensor and the fourth photoelectric sensor, the housing being located substantially between the driver's seat and front passenger seat.

20. The alert system of claim 19, the housing including a first window in the first path, a second window in the second path, a third window in the third path, and a fourth window in the fourth path.

* * * * *